United States Patent Office 3,479,325
Patented Nov. 18, 1969

3,479,325
PROCESS FOR PREPARING SUBSTANTIALLY ANHYDROUS POLYURETHANE COMPOSITIONS USING AN ORGANIC SULFONYL MONOISOCYANATE
Friedrich Blomeyer, Cologne-Stammheim, and Gunter Oertel, Cologne-Flittard, Germany, assignors to Farbenfabriken Bayer Aktiengesellschaft, Leverkusen, Germany, a corporation of Germany
No Drawing. Filed Dec. 29, 1966, Ser. No. 605,564
Claims priority, application Germany, Dec. 30, 1965, F 48,060
Int. Cl. C08g 22/04
U.S. Cl. 260—77.5          7 Claims

ABSTRACT OF THE DISCLOSURE

A method is provided for preparing a substantially anhydrous polyurethane composition from components which contain water wherein an organic sulfonyl monoisocyanate is mixed with one or more of the components containing the water.

---

This invention relates to polyurethanes and, more particularly to non-cellular and substantially bubble-free polyurethane materials.

Polyurethane compositions in general and lacquers in particular are produced from polyisocyanates and polyhydroxyl compounds by the so-called two-component process. During this process, a considerable amount of carbon dioxide is evolved due to an isocyanate-water reaction which occurs in addition to the main reaction which produces the polyurethane. As a result, in the preparation of solvent-free lacquers, the described reactions are often accompanied by foam or bubble formation, depending upon the water content of the polyhydroxyl compound and of the pigment mixture used in the reaction. In the preparation of two-component lacquers which contain solvents, the foam formation depends upon the concentration of polyisocyanate and polyhydroxyl compound in the lacquer, which concentration can be controlled or reduced by lowering the solid content and by the choice of solvent. For this reason, two-component lacquers which contain solvents may only be applied to a substrate in thin layers.

However, moisture-drying single-component polyurethane lacquers are cured by the isocyanate-water reaction with the formulation of polyurea groupings. In the production of these lacquers, certain conditions should be maintained for the exclusion of moisture or water from the reactants as well as the reaction mixture in order to obtain single-component lacquers which have free isocyanate groups and which are stable during storage. A closed apparatus which precludes the moisture in the air from reaching the reaction mixture must be employed and only completely anhydrous solvent/polyol mixtures and pigment/filler mixtures may be used.

Methods of dehydrating solvent/polyol mixtures, including pigment/filler mixtures, have long been known. For example, drying by azeotropic distillation is an old method, but it involves high equipment expense. More simply, pigments can be dried by using relatively high temperatures; nevertheless, the incorporation of the pigments into the lacquer remains restricted to the trituration method in a ball mill.

Technical advance has been achieved with the use of substances which physically absorb or which chemically neutralize water. Thus, film-free or bubble-free polyurethane compositions are obtained in a simple manner from solvent-free, two-component polyurethane lacquers with the use of a sodium aluminosilicate as described in German Patent No. 1,134,634 and "Official Digest," February 1962, page 162. Alkaline earth oxides, aluminium or magnesium-1-halides or methyl hydrides have also been proposed as described in German Patent No. 1,170,627, as well as anhydrous calcium sulphate in amounts of up to 5%.

Further, alkyl orthoformates, trichlorotriethyl phosphite or o-tetraalkyl silicates as described in German Patent No. 1,164,079 have also been proposed as water-binding agents for solvent-free lacquer systems in order to achieve a lacquer free foam and bubbles. These compounds are also suitable as storage stabilizers for moisture-drying, single-component polyurethane lacquers as described in Belgian Patent No. 647,453. Alkyl orthoformates, trichlorotriethyl phosphite or o-tetraalkyl silicates permit the production of clear, pigmented or unpigmented, single-compound and two-component lacquers. They are disadvantageous, however, in that their effective range is limited. If the water content of the polyhydroxyl compounds, pigments and solvents to be dried is high, the orthoformates, phosphites, silicates and the like are not efficient. This is particularly disadvantageous since, in practice, the products available for the manufacture of lacquers are generally moisture-saturated and their water content easily exceeds the effective water absorbing range of such water-binding agents.

Low molecular weight isocyanates such as phenyl isocyanate, tolylene isocyanate or diphenylmethane diisocyanate are also used for drying pigments, fillers and coal tars. However, some of these products have a high vapor pressure, are darkly colored, very toxic and very highly reactive with water. A diisocyanate may even react spontaneously with water to form an insoluble polyurea resin-like precipitate which must usually be separated by filtration or decantation.

It is therefore an object of this invention to provide a method for the preparation of liquid or pasty, clear or pigmented, solvent-containing or solvent-free, products which are devoid of the foregoing disadvantages.

It is a further object of this invention to provide a method for the preparation of bubble-free polyurethanes wherein the water is absorbed chemically without the formation of a precipitate.

Still another object of this invention is to provide a method for the preparation of a bubble-free polyurethane which may be applied in any desired thickness to a substrate and in which any desired pigment and/or filler may be used.

Yet another object of this invention is to provide a method for increasing the pot life of polyurethane formulations.

The foregoing objects and others which will become apparent from the following description are accomplished in accordance with this invention, generally speaking, by reacting an organic polyisocyanate with a compound containing active hydrogen containing groups as determinable by the Zerewitinoff method in the presence of an organic sulfonyl isocyanate water-binding agent. Thus, liquid or pasty, clear or pigmented, solvent-containing or solvent-free polyurethane compositions which are free from bubbles can be obtained easily and efficiently regardless of the quantity of water present in the active hydrogen containing compound as well as in any pigments, fillers and the like which may be added to the reaction mixture.

Contrary to the activity of the aryldiisocyanates proposed heretofore, an organic bound sulfonyl isocyanate group reacts with one molecule of water to form a sulphonamide which does not react further with free isocyanate groups. The compounds thus formed are therefore of a low molecular weight and remain soluble, independently of the water content. Surprisingly, the readily crystallizable sulphonamides formed do not crystallize out from solidifying polyurethane films and do not cause them to cloud or opalesce. Hence, there is no need to separate the water-sulfonyl isocyanate reaction product from the polyurethane reaction mixture and one costly step in the preparation of a bubble-free polyurethane is saved.

In solvent-containing two-component lacquers, it is possible to use higher concentrations of the polyisocyanate to polyhydroxyl compound in the lacquer or to apply the lacquers at a greater layer thickness to a support when the organic sulfonyl isocyanates of this invention are present. The organic sulfonyl isocyanates stabilize pigmented and unpigmented moisture-drying single-component polyurethane lacquers without any risk of detrimentally affecting the final product. Because of the high water-combining power of the organic sulfonyl isocyanates, an unrestricted range of pigments can be used and even colloidally dispersed silicon dioxides, which are used for delustering purposes and often contain more than 6% water, can be safely introduced into polyurethane compositions when the sulfonyl isocyanates are present. The water-binding action of the sulfonyl isocyanates is so marked that the pot life of two-component lacquers is lengthened whether or not they contain solvents.

Any organic sulfonyl isocyanate may be used in the process of this invention. It is preferred that monoisocyanates are employed, e.g., those of the formula $R-SO_2-NCO$. In this formula R designates an aryl, alkyl or cycloalkyl radical. The radicals can be substituted by chlorine. Specifically phenyl and naphthyl radicals which can be alkyl- or chlorine-substituted or their hydrogenation products. Alkyl groups up to 18 carbon atoms are preferred.

Suitable sulfonyl isocyanates following the above formula are for example p-tolylsulfonyl isocyanate, p- or m-chlorophenyl sulfonyl isocyanate, phenyl sulfonyl isocyanate, ethyl sulfonyl isocyanate, beta-chloroethyl sulfonyl isocyanate, methylsulfonyl isocyanate, cyclohexylsulfonyl isocyanate, chloromethyl sulfonyl isocyanate.

Sulfonyl isocyanates are prepared by conventional methods and are readily obtained, for example, by phosgenating sulfonamides, by the action of oxalyl chloride on sulfonamides, or by reacting sulfonyl chloride with alkali metal cyanates.

The range of effectiveness of the organic sulfonyl isocyanate is so broad that high proportions of water, even greater than 1%, can be removed from the reaction mixture without difficulty and any arbitrary sequence can be chosen when removing the water from separate constituents of the lacquer. The following methods of treatment are preferred, however, in the practice of this invention:

In the preparation of clear, unpigmented lacquers, the solvent mixture to be used is first treated with a sulfonyl isocyanate, after which the polyol or active hydrogen-containing compound is added. If the polyhydroxyl compound is also to be made anhydrous, then the treatment of the polyol is effected directly with the organic sulfony isocyanate (solvent-free lacquers) or higher proportions of the organic sulfonyl isocyanate than are necessary for removing the water from the solvent mixture are used as required. The polyhydroxyl compound may then be added to the reaction mixture and reacted with a suitable isocyanate.

In the preparation of pigmented lacquers, suspensions of the pigment-filler mixtures are first treated in solvents with sulfonyl isocyanates and the polyhydroxyl compound is then added. In the preparation of solvent-free lacquers, the pigment-filler mixture is suspended either in the liquid polyhydroxyl compound or in a plasticizer, which should only be treated with a suitable sulfonyl isocyanate after being permitted to stand for about 12 hours. The waiting period is necessary in order to insure that the moisture has migrated from the pigment and provides a guarantee that the reactive sulfonyl isocyanate will react predominantly with the water present and not with the hydroxyl groups of the polyhydroxyl compound, except perhaps to a purely subordinate degree.

According to another preferred embodiment, the sulfonyl isocyanate used in the invention can be combined with the polyisocyanate.

The quantities of the organic sulfonyl isocyanates to be used in the preparation of a polyurethane are dependent upon the moisture content of the substances to be dried and should slightly exceed a stoichiometric equivalent quantity of the water present as calculated from the reaction equation. Preferably, about 0% to about 1% by weight of the organic sulfonyl isocyanate in excess of equivalent quantity for water present should be used. For example, about 11 g. of p-toluylsulfonyl isocyanate are required to combine with about 1 g. of water; in the preparation of clear lacquers having moisture contents of about 0.1% or about 0.5%, the sulfonyl isocyanate is added in quantities of about 1.5% and about 6%, respectively. In order to stabilize pigmented, single-component polyurethane lacquers with pigment contents of about 50% or about 150% with a water content of about 1% in the pigment and about 60% of solids in the lacquer, about 2.5% and about 4%, respectively, of a suitable sulfonyl isocyanate are used. The indicated quantities can also be exceeded slightly if desired without influencing the film properties.

One-component and two-component solvent-containing and solvent-free polyurethane lacquers can be obtained by reacting any suitable polyisocyanates with any suitable polyhydroxyl compounds. Although the starting materials for solvent-containing, two-component lacquers may be liquid to resinous, in the preparation of solvent-free lacquers the starting materials must be liquids having a low viscosity, or else the resinous starting material must be soluble in a plasticizer.

Solvent-containing and solvent-free moisture-drying, single-component polyurethane lacquers are adducts of low molecular weight polyisocyanates and polyhydroxyl compounds, in the preparation of which the NCO:OH ratio may fluctuate within wide limits. In the preparation of two-component lacquers, however, the NCO:OH ratio is from about 1.0 to about 1.2 although it is quite usual to exceed or fall short of these values by about 0.5 to about 11.5 in order to obtain certain desired properties and resistance values in the final product. Furthermore, with single-component polyurethane lacquers having free isocyanate groups, the NCO:OH ratio may fluctuate from about 1.4 to about 40.0 and is greatly dependent upon the solution and crystallization behavior of the reaction product which must remain soluble or should show no tendency to crystallize.

Any suitable organic polyisocyanate such as, for example, those listed in Annalen 562,575 (1949) and Canadian Patent 698,636 may be used to prepare the polyurethanes of this invention, as well as polymethylene diisocyanates such as hexamethylene diisocyanate, omega, omega-diisocyanato - 1,3 - dimethylbenzene, 3-phenylisocyanato-1'-a-ethylisocyanate, tolylene diisocyanate mixtures, tolylene-2,4-diisocyanate, tolylene-2,6-diisocyanate, diphenylmethane-4,4'-diisocyanate, 3,3'-dimethyldiphenylmethane-4,4'-diisocyanate, 1,1 - diphenylcyclohexyl-4',4"-diisocyanate and the like. Further, biuret triisocyanates such as, for example, those prepared from three mols of any of the foregoing isocyanates, specifically hexamethylene diisocyanate, and one mol of water, acylisocyanates of monobasic or polybasic carboxylic acids such as, for example, from one mol of acetic acid and two mols of tolylene diisocyanate or hexamethylene diisocyanate; carbodiimides with free terminal NCO groups prepared from polyisocyanates with catalysts such as, for example, phosphine oxides; dimers, trimers and the like of any of the foregoing isocyanates which have free NCO groups; prepolymers having terminal NCO groups, hydrogenated isocyanates such as hydrogenated tolylene diisocyanate and 4,4'-diphenylmethane diisocyanate; masked isocyanates; the corresponding thioisocyanate of any of the foregoing and mixtures thereof and the like may also be used.

The prepolymeric isocyanates mentioned are the reaction products of an excess of a polyisocyanate such as any of those listed herein, but generally diisocyanates, with a compound having reactive hydrogen atoms as determinable by the Zerewitinoff method. In the preparation of the prepolymer, any suitable active hydrogen containing compound may be used such as, for example, polyhydric alcohols, including ethylene glycol, diethylene glycol, butylene glycol, glycerine, trimethylol propane, hexanetriol, polypropylene glycol, polyethylene glycol, adipic acid glycol polyesters and dilinoleic acid glycol polyesters having hydroxyl groups, thioether alcohols or dihydroxydialkylpolysulfides of, for example, thiodiglycol and hexanediol or alkylene oxides and sodium polysulfides, alcoholysis products of natural oils or fats with an excess of polyisocyanate, mainly hexamethylene diisocyanate, tolylene diisocyanate or diphenylmethane diisocyanate and the like.

Any suitable active hydrogen containing compound having groups reactive with NCO groups as determined by the Zerewitinoff method can be used to prepare the polyurethanes of this invention. Some such suitable compounds are, for example, those listed in U.S. Patent 3,201,372, as well as polythioether alcohols obtained for example, by etherifying thiodiglycol with dihydric and polyhydric alcohols or corresponding alcohol mixtures; polyacetals prepared, for example, from polyhydric alcohols or thioether alcohols and formaldehyde; silicon resins containing free hydroxyl groups; the addition products of alkylene oxides with ammonia or with amines and hydrazines, such as triethanolamine or triisopropanolamine and the like compounds and mixtures thereof.

The solvents used in the present process are without exception those used hitherto in the art of polyurethane lacquers. Suitable solvents for the polyurethane lacquers are for example ethyl acetate, butyl acetate, methyl Cellosolve acetate, toluene, xylene, methylisobutyl ketone.

Any and all pigments and fillers used for filling and pigmentation purposes may be used in the preparation of the polyurethanes of this invention, regardless of their water content. Even colloidally dispersed silicon dioxides which have a moisture content of about 6% can be dried and utilized in the process of this invention. The incorporation of the pigments and fillers into the reaction mixture may be effected in any suitable manner and is usually carried out after they have been dried by being mixed into the polyol with high-speed stirrer mechanisms or the usual trituration assemblies. The extent of the pigmentation is completely immaterial to the process of this invention and may amount of 600% and more. Resins, coal tars, natural or synthetic asphalt and coumarone resins, in addition to the pigments and fillers, may also be dried and incorporated into a polyurethane reaction mixture according to this invention.

The single-component and two-component polyurethane lacquers of this invention are suitable for painting wood, metal and concrete surfaces, as acid-resistant and alkaline-resistant linings, floor coverings, printing inks, as adhesion promoters, lining adhesives, casting resins for the electrical industry, plastics compositions, acid-resistant and alkali-resistant mortars and coatings for tar, metal or concrete roads or bridge fittings. In these and other applications they may be processed and handled as any other similar material is processed and handled.

The invention is further illustrated but is not intended to be limited by the following examples in which all parts and percentages are by weight unless otherwise specified.

EXAMPLE 1

About 140 parts of a solvent mixture of ethylene glycol acetate, butyl acetate and xylene in a ratio of about 3:1:2 with a water content of about 0.78% are mixed with about 15 parts of methoxybutyl acetate and then with about 21 parts of p-tolylsulfonyl isocyanate. About 100 parts of a polyester prepared from adipic acid and diethylene glycol (OH content about 1.4%) are dissolved in the prepared mixture and about 230 parts of about a 67% solution of a polyisocyanate prepared from about 3 mols of tolylene diisocyanate and about 1 mol of trimethylolpropane in ethylene glycol acetate/xylene (about 1:1) are stirred into the solution which is formed. The viscosity is raised by the further addition of about a 20% solution of a copolymer of vinyl chloride and vinyl acetate in ethylene glycol acetate/cyclohexanone (about 3:1). The reaction proceeds with a rise in viscosity and is normally ended after about eight days at about 20° C. The stability in storage of the lacquer thus produced is better than about 90 days. The lacquer could easily be brushed on after this period. The same lacquer, without p-tolylsulfonyl isocyanate, gells after about four days.

EXAMPLE 2

About 140 parts of a solvent mixture of ethylene glycol acetate, butyl acetate and xylene in a ratio of about 3:1:2 with a water content of about 0.78% are mixed with about 15 parts of methoxybutyl acetate and then with about 21 parts of p-tolylsulfonyl isocyanate. About 100 parts of a polyether prepared from propylene-1,2-glycol and propylene oxide (OH content about 1.7%) are dissolved in the prepared mixture and about 230 parts of about a 67% solution of a polyisocyanate prepared from about 3 mols of tolylene diisocyanate and about 1 mol of trimethylolpropane in ethylene glycol acetate/xylene (about 1:1) are stirred into the solution which is formed. The viscosity is raised by the further addition of about a 20% solution of a copolymer of vinyl chloride and vinyl acetate in ethylene glycol acetate/cyclohexanone (about 3:1). The reaction proceeds with a rise in viscosity and is normally ended after about eight days at about 20° C. The stability in storage of the lacquer thus produced is better than about 90 days. The lacquer could easily be brushed on after this period. The same lacquer, without p-tolylsulfonyl isocyanate, gells after about four days.

EXAMPLE 3

To a delustering paste of about 85 parts of ethylene glycol acetate and about 20 parts of a readily dispersible colloidal silicon dioxide, which is produced with a high-speed stirrer, is added about 2 to about 3 parts by weight of p-tolylsulfonyl isocyanate.

The paste which is formed can be added to the clear single-component lacquers of Examples 1 or 2 in a ratio of about 1:1. After being stored for about eight weeks, the lacquers do not show any increase in viscosity and can be easily processed by brushing, wiping or spraying.

EXAMPLE 4

About 140 parts of a pigment are suspended in about 75 parts of a solvent mixture consisting of ethylene glycol acetate, butyl acetate and xylene in a ratio of about 3:1:2, and about 30 parts of methoxybutylacetate, and about 14 parts of p-tolylsulfonyl isocyanate are successively added. About 100 parts of either a polyether or a polyester as described in Examples 1 and 2 are added to the suspension after it has been standing for about four hours, and the admixture is triturated in a funnel mill. About 230 parts of about a 67% solution of a polyisocyanate as described in Example 1, about 20 parts of about a 20% solution of a copolymer as described in Example 1 and about 4 parts of about a 10% solution of a low-viscosity copolymer of butylacrylate and vinylisobutylether in toluene are then added. The reaction which takes place is completed at normal temperatures after about eight days. The lacquer obtained can still be smoothly worked after being kept for about 40 days.

Green chromium oxide, lead chromate, red iron oxide, titanium dioxide (Rutile) and the like may be used as the aforementioned pigment. In the lacquers pigmented with titanium dioxide, the p-tolylsulfonyl isocyanate is preferably replaced by any of the following water-binding sulfonyl isocyanates: p-chlorophenylsulfonylisocyanate, phenylsulfonyl isocyanate and ethylsulfonyl isocyanate; the stabilizing effect obtained is equally good.

EXAMPLE 5

About 630 parts of lead chromate, about 70 parts of red iron oxide, about 80 parts of microfine talcum, about 120 parts of microfine asbestos and about 8 parts of a gelling agent consisting of bentonite or montmorillonite with organic bases and prepared by a cation-exchange reaction, are suspended in about 460 parts of a solvent mixture consisting of ethylene glycol acetate, butyl acetate and xylene in a ratio of about 3:1:2, and about 40 parts of methoxybutyl acetate together with about 40 parts of p-tolylsulfonyl isocyanate are added. About 210 parts of a polyester or polyether as described in Examples 1 and 2 are added to the mixture after it has been standing for about 6 hours and the admixture is triturated in a ball mill. About 480 parts of the 67% solution of a polyisocyanate described in Example 1 and about 30 parts of about a 10% solution of cellulose acetobutyrate in ethylene glycol acetate are then added. The corrosion-resistant priming lacquer which is formed can still be worked after eight days and shows a constant viscosity for more than about eight weeks.

EXAMPLE 6

About 250 parts of about a 10% swelled mass of the gelling agent described in Example 4 in ethylene glycol acetate are diluted with about 650 parts of a solvent mixture consisting of ethylene glycol acetate, butyl acetate and xylene in a ratio of about 3:1:2. The following substances are then added in the sequence indicated:

(1) About 50 parts of p-tolylsulfonyl isocyanate;
(2) About 240 parts of a polyether as described in Example 1;
(3) About 620 parts of the 67% solution of a polyisocyanate as described in Example 1;
(4) About 50 parts of about a 10% solution of cellulose acetobutyrate in ethylene glycol acetate; and
(5) About 5600 parts of super-fine powdered zinc.

The powdered zinc priming which is obtained is stable upon storage. It shows good under-water strength and heat strength and can be welded.

EXAMPLE 7

A suspension of about 90 parts of titanium dioxide (Rutile), about 100 parts of blanc fixe, about 500 parts of chalk, about 50 parts of a gelling agent as described in Example 4, and about 25 parts of an alkyl sulfonic acid ester of a phenol/cresol mixture in about 150 parts of a solvent mixture consisting of ethylene glycol acetate, butyl acetate and xylene in a ratio of about 3:1:2 is mixed with about 50 parts of p-tolylsulfonyl isocyanate. After standing for about 12 hours, about 40 parts of castor oil and about 60 parts of a polyether prepared from propylene-1,2-glycol and propylene oxide (OH content 3.4%) are incorporated by stirring. The mixture which is formed is triturated on a funnel mill. About 220 parts of about a 75% solution of a polyisocyanate prepared from about 3 mols of tolylene diisocyanate and about 1 mol of trimethylolpropane in ethyl acetate are then admixed therewith.

The trowelling composition which is obtained is stable upon storage, has good drawing properties and can be ground.

EXAMPLE 8

About 30 parts of red iron oxide and about 20 parts of talcum are suspended in a mixture of about 12 parts of ethylene glycol acetate, about 8 parts of butyl acetate, about 10 parts of xylene and about 53 parts of a tar solution and mixed with about 1.5 parts of p-tolylsulfonyl isocyanate. After being permitted to stand for one day, the mixture is stirred with about 20 parts of an epoxide resin based in diphenylolpropane and epichlorohydrin (epoxy value of about 0.52) and then tritured. Thereafter, about 46 parts of about a 67% solution of a polyisocyanate as described in Example 1 are added.

The lacquer obtained is stable upon storage for more than about eight weeks and can be thoroughly hardened with water or moisture.

The tar solution has about the following composition:

Water—about 0.5% by weight.
Light oil (up to 170° C.—10–18% by weight.
Medium oil (170–270° C.)—4–10% by weight.
Heavy oil and anthracene oil (above 270° C.)—1032% by weight.
Pitch residue—52–62% by weight.
Solidification point—67° C.

EXAMPLE 9

About 18 parts of p-tolylsulfonyl isocyanate are added to about 600 parts of the tar solution described in Example 7. The water-combining action takes place within a few minutes with foam formation. The viscosity of the tar is not increased.

The dried tar solution is diluted with about 310 parts of a propoxylated trimethylolpropane (OH No. about 379). After mixing in about 310 parts of technical diphenylmethane diisocyanate, the tar hardens without bubble formation.

EXAMPLE 10

A mixture of about 48.5 parts of the tar solution described in Example 7 and about 1.5 parts of p-tolylsulfonyl isocyanate is allowed to stand for about nine days and then about 0.5 part of triethanolamine and about 1.4 parts of triethyleneglycol are added with careful stirring. An adduct of tolylene diisocyanate and a polythioether consisting of about 70 parts of thiodiglycol and about 30 parts of hexanediol with an isocyanate content of about 4% is thoroughly mixed therein by stirring. The composition which is formed can be used for the manufacture of joint-sealing compounds and hardens thoroughly without any bubbles. The curing itself takes place later.

EXAMPLE 11

About 50 parts of the tar solution described in Example 7, about 25 parts of red iron oxide, about 15 parts of talcum, about 10 parts of solvent naphtha and about 4 parts of p-tolylsulfonyl isocyanate are mixed with one another and allowed to stand for about three days. About 36 parts of about a 75% solution of a branched polyester of phthalic acid, glycerine and a synthetic fatty acid mixture (OH No. about 155) in xylene and about 1 part of about a 50% solution of a low viscosity copolymer as described in Example 3 in toluene are incorporated into the tar composition by stirring. The mixture which is formed is triturated on a funnel mill. This trituration may take place by the two-component method. For this purpose, it is mixed just before being worked up with about 31 parts of about a 75% solution of the polyisocyanate as described in Example 6. The lacquer obtained has a pot life of about 6 hours. When p-tolylsulfonyl isocyanate is not used, the pot life is only about 2 to 2½ hours. The drying time for the lacquers, with or without the water-combining agents according to the invention, is the same and takes about 1¼ hours until a tack-free state is attained, and about 3 hours to pressure tightness.

EXAMPLE 12

About 100 parts of a liquid coumarone-indene resin and about 100 parts of titanium dioxide (Rutile) are triturated on a funnel mill and thereafter mixed with about 10 parts of p-tolylsulfonyl isocyanate. After standing for about one day, about 60 parts of a propoxylated trimethylolpropane according to Example 8 are incorporated by stirring. The solvent-free mixture formed can be further worked up by the two-component method. By way of example, about 60 parts of technical diphenylmethane diisocyanate are stirred into the mixture. No foaming is observed. The composition which is obtained has a dry, non-tacky surface in about 7½ hours and is thoroughly hardened in about 3 days.

When p-tolylsulfonyl isocyanate is not used, a high degree of foaming occurs.

EXAMPLE 13

About 100 parts of a propoxylated trimethylolpropane as described in Example 8 are mixed with about 5 parts of p-tolylsulfonyl isocyanate. A violent reaction begins to take place during the stirring operation. Any precipitate formed dissolves at about 80° C. in a few minutes; at a temperature of about 20° C., however, a few days are required to dissolve the precipitate. After cooling the resulting solution, about 100 parts of technical diphenylmethane diisocyanate are added to it. The mass obtained is poured into a mold; within about 2 hours it is viscous and after about 3 days it shows a bubble-free tacky surface. Without p-tolylsulfonyl isocyanate, the mass shows strong foaming after being kept for 3 days.

EXAMPLE 14

About 10 parts of p-tolylsulfonyl isocyanate and about 100 parts of titanium dioxide (Rutile) are mixed and, after standing for about one day, combined with about 100 parts of a propoxylated trimethylolpropane as described in Example 8 and triturated on a funnel mill. The solvent-free mixture which is obtained is processed by the two-component method. About 100 parts of technical diphenylmethane diisocyanate are then stirred into the mixture, it is poured into a mold and is viscous in about 60 to about 80 minutes. After about one day, the curing is completed without the formation of foam.

In the absence of p-tolylsulfonyl isocyanate, there is very strong foam formation.

EXAMPLE 15

About 140 parts of red iron oxide are triturated in a solution of about 100 parts of a polyester or polyether as described in Examples 1 and and 2 in about 30 parts of methoxybutyl acetate and about 75 parts of a mixture of ethylene glycol acetate, butyl acetate and xylene in a ratio of about 3:1:2, the trituration taking place in a funnel mill. Thereafter, about 244 parts of a mixture of the 67% solution of a polyisocyanate described in Example 1 with p-tolylsulfonyl isocyanate in a ratio of about 50:3 are stirred into the triturated mixture. About 20 parts of about a 20% solution of a copolymer as described in Example 1 and about 4 parts of about a 10% solution of a low viscosity copolymer as described in Example 3 are then added. A moisture-drying single-component lacquer is obtained which does not show any change in viscosity after being stored for 42 days.

EXAMPLE 16

A mixture of about 380 parts of titanium dioxide (Rutile), about 500 parts of a solvent mixture consisting of ethylene glycol acetate/xylene (about 1:2), about 100 parts of a branched polyester of trimethylol propane, adipic acid and phthalic acid having an hydroxyl content of about 8.8%, about 100 parts of a branched polyester of trimethylolpropane, butylene glycol and adipic acid having an hydroxyl content of about 6.5%, about 200 parts of a branched polyester of glycerine, phthalic acid and a synthetic fatty acid mixture having an hydroxyl content of about 5%, about 400 parts of about a 20% solution of a copolymer as described in Example 1 in a solvent mixture of methylisobutyl ketone, ethylene glycol acetate and xylene in a ratio of about 1:1:1, about 7 parts of about a 10% solution of a low viscosity copolymer as described in Example 3 in ethylene glycol acetate/ xylene (about 1:1) and about 70 parts of about a 10% suspension of a gelling agent as described in Example 4 is triturated on a funnel mill. The triturate which is formed can be worked up by the two-component method. Separate portions of this triturate without additives and provided with increasing amounts of p-tolylsulfonyl isocynate, are thereafter mixed with the 7% solution of a polyisocyanate described in Example 1. The following results were found for the standing times indicated.

Added quantities of p-toluylsulphonyl isocyanate calculated on total lacquer:

| | Standing time, days |
|---|---|
| 0% | 2 |
| 3% | 2 |
| 6% | 3 |
| 9% | 4 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. In the preparation of a substantially anhydrous polyurethane composition from components containing water, the method which comprises mixing with one or more of the components containing the water an organic sulfonyl monoisocyanate in an amount within the range of from about and equivalent amount up to about a 1% excess of the water present in the said components and allowing the said monoisocyanate to react with the water.

2. The method of claim 1 wherein a clear, unpigmented polyurethane lacquer is prepared from a solvent, an organic compound containing at least two active hydrogen atoms as determined by the Zerewitinoff method and an organic polyisocyanate in which an organic sulfonyl monoisocyanate is included in the solvent before the reactants are added to one another therein.

3. The method of claim 2 wherein an organic sulfonyl monoisocyanate is included in said organic compound having reactive hydrogens before being added to the reaction mixture.

4. The method of claim 1 wherein a pigmented polyurethane lacquer is prepared from a solvent, a pigment-filler mixture, an organic compound containing at least two active hydrogen atoms as determined by the Zerewitinoff method and an organic polyisocyanate in which the pigment-filler mixture is added to the solvent and an organic sulfonyl monoisocyanate is included in the solvent before the said organic compound having reactive hydrogens and the polyisocyanate are added thereto.

5. The method of claim 1 wherein an organic polyisocyanate and a compound containing at least two active hydrogen atoms as determined by the Zerewitinoff method are included in the components of the polyurethane and the organic sulfonyl isocyanate is combined with the polyisocyanate before it is added to the reaction mixture.

6. The method of claim 1 wherein the organic sulfonyl isocyanate has the formula R—SO$_2$—NCO wherein R is an aryl, alkyl or cyclo-alkyl radical which may be substituted with chlorine.

7. The method of claim 8 wherein the organic sulfonyl isocyanate is p-tolyl sulfonyl isocyanate.

References Cited

UNITED STATES PATENTS 3,330,849  7/1967  Ulrich _____ 260—453

OTHER REFERENCES

Billeter, Berichte Dent. Chem. Ges. 37, 690–692 (1904).

DONALD E. CZAJA, Primary Examiner

H. S. COCKERAM, Assistant Examiner

U.S. Cl. X.R.

106—14, 20; 260—2, 18, 28, 81, 37, 858